United States Patent
Shin et al.

(10) Patent No.: US 11,093,273 B2
(45) Date of Patent: Aug. 17, 2021

(54) SYSTEM AND METHOD FOR VERIFYING VEHICLE CONTROLLER BASED ON VIRTUAL MACHINE

(71) Applicants: Hyundai Motor Company, Seoul (KR); Kia Motors Corporation, Seoul (KR)

(72) Inventors: Dong Jin Shin, Gyeonggi-do (KR); Dong Youl Lee, Seoul (KR); Myeong Gyu Jeong, Seoul (KR); Jae Am Seo, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 137 days.

(21) Appl. No.: 16/207,139

(22) Filed: Dec. 2, 2018

(65) Prior Publication Data
US 2020/0089519 A1    Mar. 19, 2020

(30) Foreign Application Priority Data

Sep. 14, 2018    (KR) .......................... 10-2018-0110479

(51) Int. Cl.
G06F 9/455    (2018.01)
G06F 16/23    (2019.01)
B60W 50/00    (2006.01)

(52) U.S. Cl.
CPC ...... *G06F 9/45558* (2013.01); *G06F 16/2365* (2019.01); *B60W 50/00* (2013.01); *B60W 2556/45* (2020.02); *G06F 2009/45595* (2013.01)

(58) Field of Classification Search
CPC ............. G06F 9/45558; G06F 16/2365; G06F 2009/45595; B60W 2556/45; B60W 50/00
See application file for complete search history.

(56) References Cited

U.S. PATENT DOCUMENTS 6,028,553 A * 2/2000 Oberstein .............. G01C 21/26
                                                            342/357.31
2004/0232770 A1   11/2004 Gisy et al.
(Continued)

FOREIGN PATENT DOCUMENTS

| JP | 2014-035744 A | 2/2014 |
| KR | 10-1102916 B1 | 1/2012 |
| KR | 10-1294088 B1 | 8/2013 |

OTHER PUBLICATIONS

Extended European Search Report for European Patent Application No. 18210491, dated Feb. 26, 2019, 10 pages.

*Primary Examiner* — Sisley N Kim
(74) *Attorney, Agent, or Firm* — Mitz Levin Cohn Ferris Glovsky and Popeo, P.C.; Peter F. Corless

(57) ABSTRACT

Disclosed are a system and a method for verifying a vehicle controller based on a virtual machine. A system for verifying a vehicle controller based on a virtual machine may include: a server configured to store software of upper level controllers of a vehicle and to execute the software of the upper level controllers through the virtual machine; and a telematics terminal configured to collect input data of the upper level controllers and to transmit the input data to the server. The telematics terminal may be further configured to compare first output data collected from the upper level controllers with second output data received from the server corresponding to the input data, and to verify a validity of the first output data based on the comparison of first output data with the second output data.

15 Claims, 8 Drawing Sheets

(56) References Cited

U.S. PATENT DOCUMENTS

| | | | |
|---|---|---|---|
| 2011/0191659 A1* | 8/2011 | Fuhrmann | H04L 12/40006 |
| | | | 714/807 |
| 2012/0191440 A1 | 7/2012 | Meagher et al. | |
| 2015/0113520 A1* | 4/2015 | Kotani | G06F 8/654 |
| | | | 717/172 |
| 2015/0161298 A1 | 6/2015 | Meagher et al. | |
| 2016/0121727 A1* | 5/2016 | Kim | B60L 7/26 |
| | | | 701/70 |
| 2017/0147320 A1* | 5/2017 | Persson | G06F 8/65 |
| 2018/0093664 A1* | 4/2018 | Kim | B60W 10/10 |

* cited by examiner

| S/W ID (Part Number) | Version | CONTROLLER S/W (ROM Binary) | Virtual Machine | Input | Output |
|---|---|---|---|---|---|
| 11111-22222 | 2.0 | a11111_v20.hex | VM_01 | VEHICLE SPEED, SET SPEED,.... | ACCELERATION, BRAKE,.... |
| ... | ... | ... | ... | ... | ... |

FIG.5

| SIGNAL | CAN SIGNAL | SERVER SIGNAL | TOLERANCE OF ERROR | TOLERANCE OF TIME DIFFERENCE |
|---|---|---|---|---|
| REQUIRED ACCELERATION | CF_SCC_AccDem | 1 | 1.5 m/s2 | 2sec |
| REQUIRED BRAKE PRESSURE | CF_SCC_BrkPres | 2 | 20 hPa | 3sec |
| ... | ... | ... | ... | ... |

FIG.6

SYSTEM AND METHOD FOR VERIFYING VEHICLE CONTROLLER BASED ON VIRTUAL MACHINE

CROSS-REFERENCE TO RELATED APPLICATION

This application claims the benefit of priority to Korean Patent Application No. 10-2018-0110479, filed in the Korean Intellectual Property Office on Sep. 14, 2018, the entire contents of which are incorporated herein by reference.

TECHNICAL FIELD

The present disclosure relates to a system and a method for verifying vehicle controller based on a virtual machine.

BACKGROUND

Conventional vehicle controllers are composed of a semiconductor. There is a possibility of the semiconductor causing an error in the operation of the controller due to an instantaneous electromagnetic wave or the like. Therefore, in order to stabilize the vehicle controller, redundancy is applied to reduce the possibility of error.

For example, a lockstep technique has been applied to a microcontroller. The lockstep technique uses a multi-core microcontroller (MCU) to run the same program on multiple cores, and stabilizes the vehicle controller by detecting and resetting an error when execution results of both cores are different from each other. In addition, a monitoring semiconductor can be added to increase redundancy. However, such a scheme requires an additional system and/or semiconductor, thus increasing the cost of manufacturing the vehicle controller.

SUMMARY

The present disclosure has been made to solve the above-mentioned problems occurring in the related art while advantages achieved by the related art are maintained intact.

An aspect of the present disclosure provides a system and a method for verifying vehicle controller based on a virtual machine, which can increase redundancy for each controller by providing the same program execution environment as that of a controller through a virtual machine of a server, thereby securing a stable verification scheme.

Another aspect of the present disclosure provides a system and a method for verifying vehicle controller based on a virtual machine, which can increase redundancy for each controller based on a server to eliminate the need of an additional monitoring semiconductor for each controller, thereby minimizing the cost of manufacturing.

The technical problems to be solved by the present inventive concept are not limited to the aforementioned problems, and any other technical problems not mentioned herein will be clearly understood from the following description by those skilled in the art to which the present disclosure pertains.

According to embodiments of the present disclosure, a system for verifying a vehicle controller based on a virtual machine may include: a server that stores software of upper level controllers of a vehicle and executes the software of the upper level controllers through the virtual machine, and a telematics terminal that collects input data of the upper level controllers and transmits the input data to the server. The telematics terminal may compare first output data collected from the upper level controllers with second output data received from the server corresponding to the input data and verify a validity of the first output data based on the comparison of first output data with the second output data.

The server may define and manage information in a table corresponding to software identifications (IDs), versions, read-only memory (ROM) binaries, virtual machines, input values, and output values of the upper level controllers.

The telematics terminal may transmit software ID and version information of a corresponding upper level controller together when the upper level controllers transmit the input data.

The server may verify a ROM binary based on the software ID and version information of the upper level controller received from the telematics terminal, and execute the virtual machine matching the verified ROM binary.

The virtual machine may emulate the upper level controller and execute the verified ROM binary based on the input data of the upper level controller.

The server may generate the second output data based on an output value obtained by executing the ROM binary.

The telematics terminal may perform a redundancy check on the first output data and the second output data to verify the validity of the first output data.

The telematics terminal may output a control signal to allow lower level controllers connected to a corresponding upper level controller to enter a safe mode when it is determined that the first output data is invalid.

The upper level controllers may include at least one of a power train domain control unit, a chassis domain control unit, a body/convenience domain control unit, a driver assistance system, and an autonomous drive control system.

The lower level controllers may include at least one of an engine, a transmission, a brake, a steering, an air conditioning controller unit, and a seat control unit connected to each of the upper level controllers to control operations of a sensor and an actuator.

Furthermore, according to embodiments of the present disclosure, a method for verifying a vehicle controller based on a virtual machine may include: collecting, by a telematics terminal, input data of upper level controllers of a vehicle and first output data of the upper level controllers; transmitting, by the telematics terminal, the input data to a server storing software of the upper level controllers; executing, by the server, the software of the upper level controllers through the virtual machine to generate second output data corresponding to the input data; transmitting, by the server, the second output data to the telematics terminal; comparing, by the telematics terminal, the first output data with the second output data; and verifying, by the telematics terminal, a validity of the first output data based on the comparison of first output data with the second output data.

BRIEF DESCRIPTION OF THE DRAWINGS

The above and other objects, features and advantages of the present disclosure will be more apparent from the following detailed description taken in conjunction with the accompanying drawings:

FIGS. 5 and 6 are views for explaining the operation of a system for verifying vehicle controller based on a virtual machine according to embodiments of the present disclosure;

Figure 1:
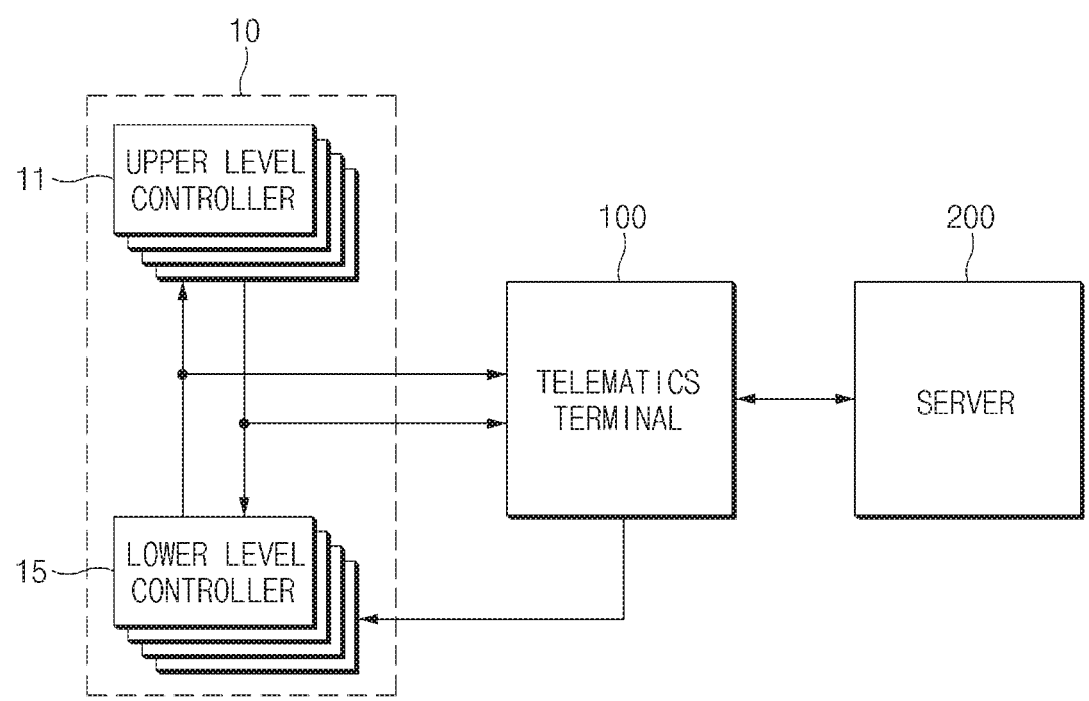
FIG. 1 is a block diagram illustrating a system for verifying vehicle controller based on a virtual machine according to embodiments of the present disclosure.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Hereinafter, exemplary embodiments of the present disclosure will be described in detail with reference to the accompanying drawings. In the drawings, the same reference numbers will be used throughout to designate the same or equivalent elements. In addition, a detailed description of well-known features or functions will be ruled out in order not to unnecessarily obscure the gist of the present disclosure.

In describing the components of the present disclosure, terms like first, second, A, B, (a), and (b) may be used. These terms are intended solely to distinguish one component from another, and the terms do not limit the nature, sequence or order of the constituent components. In addition, unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. The controller may control operation of units, modules, parts, devices, or the like, as described herein. Moreover, it is understood that the below methods may be executed by an apparatus comprising the controller in conjunction with one or more other components, as would be appreciated by a person of ordinary skill in the art.

Furthermore, the controller of the present disclosure may be embodied as non-transitory computer readable media containing executable program instructions executed by a processor. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed throughout a computer network so that the program instructions are stored and executed in a distributed fashion, e.g., by a telematics server or a Controller Area Network (CAN).

Referring now to the presently disclosed embodiments, FIG. 1 is a block diagram illustrating a system for verifying vehicle controller based on a virtual machine according to embodiments of the present disclosure.

As shown in FIG. 1, a system for verifying vehicle controller based on a virtual machine according to embodiments of the present disclosure includes a telematics terminal 100 and a server 200.

The telematics terminal 100 transmits input data of a plurality of controllers 10 for controlling the driving of a vehicle to the server 200, and in this case, compares output data received from the server 200 with output data received from the controllers 10 to verify validity of the output data of upper data.

In this case, the controllers 10 may include upper level controllers 11 and lower level controllers 15.

The upper level controllers 11 communicate with the lower level controllers 15 through a vehicle network and integrally control the operations of the lower level controllers 15.

Figure 2:
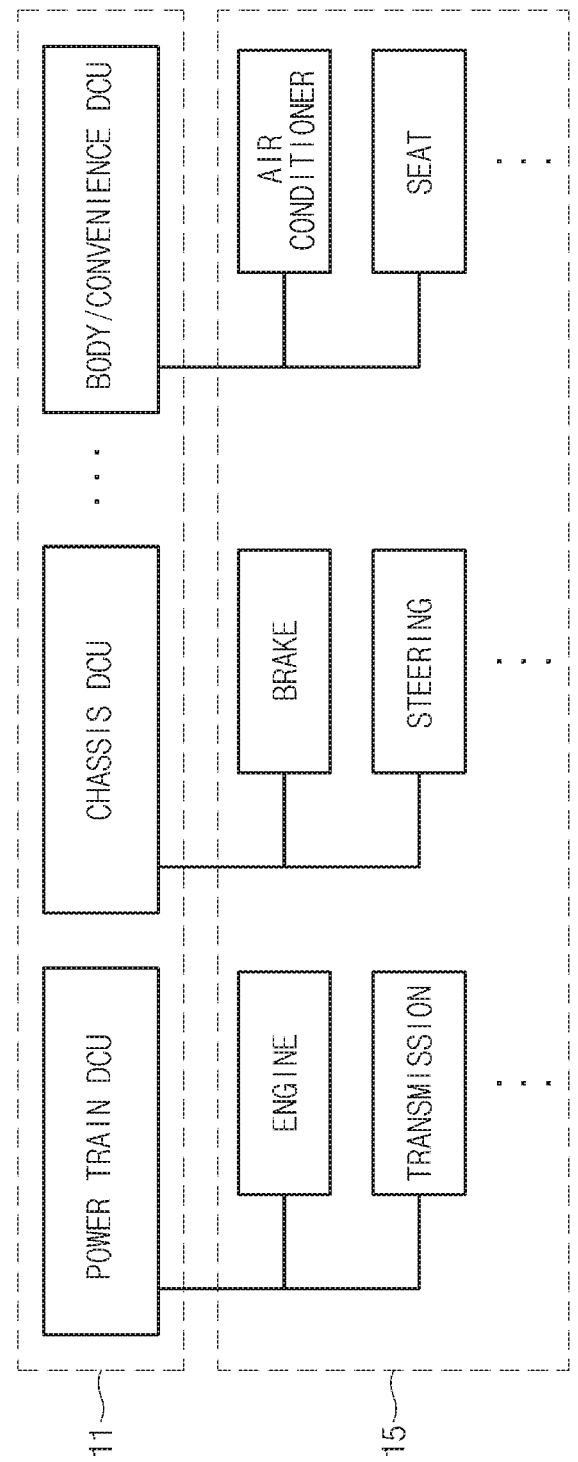
FIG. 2 is a block diagram illustrating a controller according to embodiments of the present disclosure.

As an example, as shown in FIG. 2, the upper level controllers 11 may include a power train domain control unit (DCU), a chassis DCU, and/or a body/convenience DCU. In addition, the upper level controllers 11 may include an advanced driver assistance system (ADAS), a smart cruise control (SCC) system, and the like.

The lower level controllers 15 control a sensor and/or an actuator under control of the connected upper level controller 11. In this case, the lower level controllers 15 may transmit the input data of the sensor to the upper level controller 11 connected through the vehicle network, and in this case, may control the operation of the actuator based on the output data received from the upper level controller 11.

As an example, as shown in FIG. 2, the lower level controllers 15 may include an engine, a transmission, a brake, a steering, an air conditioner, a seat, and the like.

In this case, when it is determined that the output data of the upper level controller 11 is invalid, the telematics terminal 100 may output a mode switching control signal to the lower level controllers 15 connected to the corresponding upper level controller 11. Accordingly, the lower level controllers 15 may enter a safe mode in response to the mode switching control signal of the telematics terminal 100 and block the automatic control of the upper level controller 11.

Figure 3:
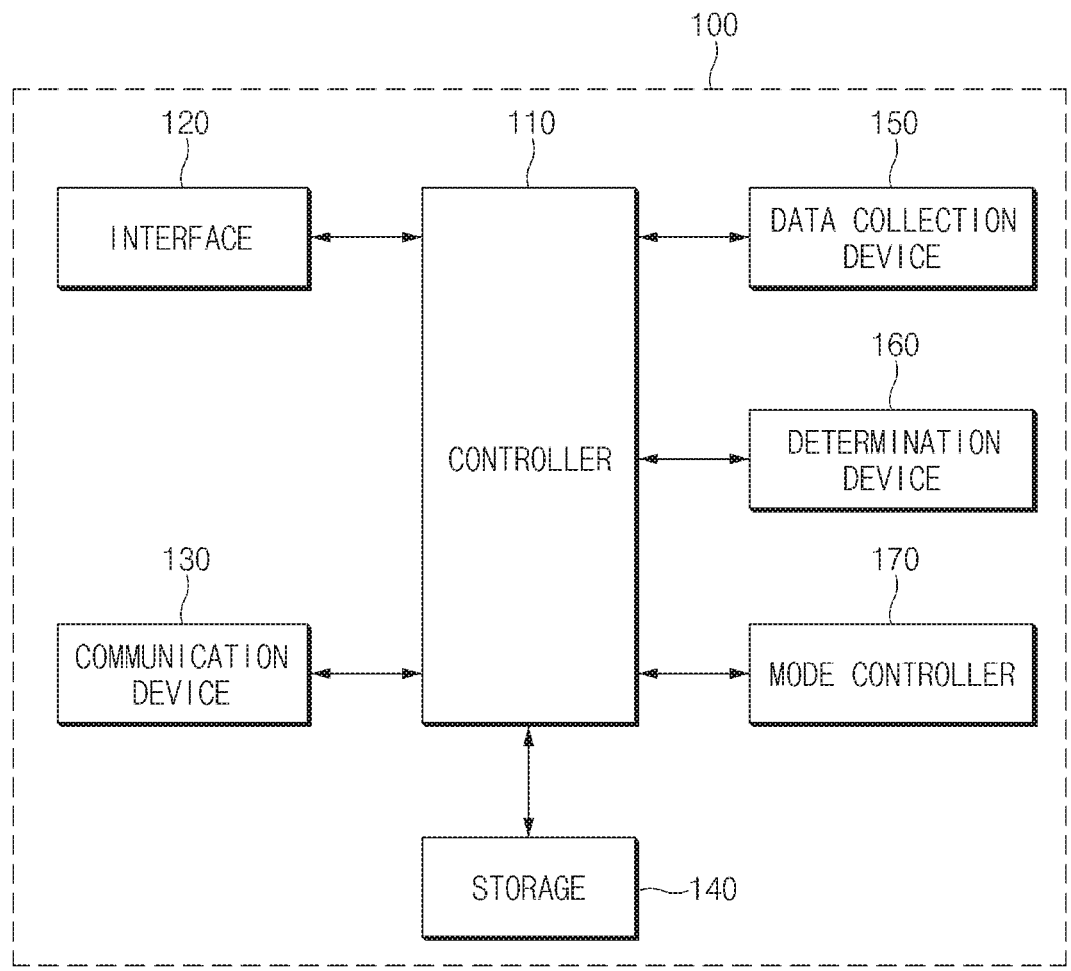
FIG. 3 is a block diagram illustrating a telematics terminal according to embodiments of the present disclosure.

The details of the telematics terminal 100 will refer to embodiments of FIG. 3.

As shown in FIG. 3, the telematics terminal 100 may include a controller 110, an interface 120, a communication device 130, storage 140, a data collection device 150, a determination device 160, and a mode controller 170. In this case, the controller 110, the data collection device 150, the determination device 160, and the mode controller 170 of the telematics terminal 100 according to the present embodiments may be implemented with at least one or more processors.

The controller 110 may process signals transmitted between components of the telematics terminal 100.

The interface 120 may include input means for receiving a control command and output means for outputting an operation state and a result of the telematics terminal 100.

In this case, the input means may include a key button, and may include a mouse, a joystick, a jog shuttle, a stylus pen, and the like. In addition, the input means may include a soft key implemented on the display.

The output means may include a display, and may include audio output means such as a speaker. In this case, when a touch sensor such as a touch film, a touch sheet, a touch pad, or the like is provided in the display, the display may operate as a touch screen, and the input means and the output means may be integrally implemented.

In this case, the display may include at least one of a liquid crystal display (LCD), a thin film transistor liquid crystal display (TFT LCD), an organic light-emitting diode (OLED), a flexible display, a field emission display (FED), and a 3D display.

The communication device 130 may include a communication module that supports a communication interface with the upper and lower level controllers. In this case, the communication module may include a module that supports vehicle network communication such as controller area network (CAN) communication, local interconnect network (LAN) communication, flex-ray communication, and the like.

In addition, the communication device 130 may include a communication module that supports a communication interface with the server 200. In this case, the communication module may include a module that supports wireless Internet communication such as a wireless LAN (WLAN), a wireless broadband (Wibro), a Wi-Fi, a world interoperability for microwave access (Wimax), and the like.

The storage 140 may store data and/or algorithms necessary for the operation of the telematics terminal 100.

For example, the storage 140 may store input/output data received from the upper and/or lower controllers through the communication device 130. In addition, the storage 140 may store output data received from the server 200.

In addition, the storage 140 may store a command and/or an algorithm to control the mode operations of the lower level controllers depending on the result that the telematics terminal 100 compares the output data from the upper level controllers with the output data of the server 200 to verify whether the output data of the upper level controller is valid.

In this case, the storage 140 may include a storage medium such as a random access memory (RAM), a static random access memory (SRAM), a read-only memory (ROM), a programmable read-only memory (PROM), an electrically erasable programmable read-only memory (EEPROM), and the like.

The data collection device 150 collects data necessary for the operation of a vehicle control system and stores the data in the storage 140.

That is, the data collection device 150 collects information about the upper and lower level controllers connected through the communication device 130. For example, the data collection device 150 may collect identification information of the upper level controller, ID of software installed in the upper level controller, version information, and the like. In addition, the data collection device 150 may collect identification information of the lower level controllers corresponding to each upper level controller. In this case, the data collection device 150 may collect information about the upper and lower level controllers every time when the vehicle switches to a start-on state.

In this case, the controller 110 transmits the collected information about the upper and lower level controllers to the server 200 connected through the communication device 130.

In addition, the data collection device 150 collects the input data transmitted from the lower level controller to the upper level controller. For example, the data collection device 150 may collect information such as a vehicle speed, a forward vehicle maintaining distance, a relative speed, a target speed, and the like transmitted from a smart cruise control (SCC) to a power train DCU as input data.

In this case, the controller 110 transmits the input data collected by the data collection device 150 to the server 200 through the communication device 130. The controller 110 may transmit the input data collected by the data collection device 150 to the server 200 every period specified in advance.

When transmitting the input data to the server 200, the controller 110 may transmit the information about the upper level controller, which receives the input data, together with, for example, the identification information of the upper level controller, the software ID, the version information, and the like.

In addition, the data collection device 150 collects output data (hereinafter, referral to as "first output data") transmitted from the upper level controller to the lower level controller corresponding to the input data.

In addition, the data collection device 150 collects second output data (hereinafter, referred to as "second output data") received from the server 200.

In this case, the server 200 stores the same software as control logic installed to the upper level controllers. When the input data is received from the telematics terminal 100, the server 200 executes the software of the corresponding upper level controller to generate the second output data for the input data, and transmits the generated second output data to the telematics terminal 100. Thus, the details of the server 200 will be further described with reference to FIG. 4.

Figure 4:
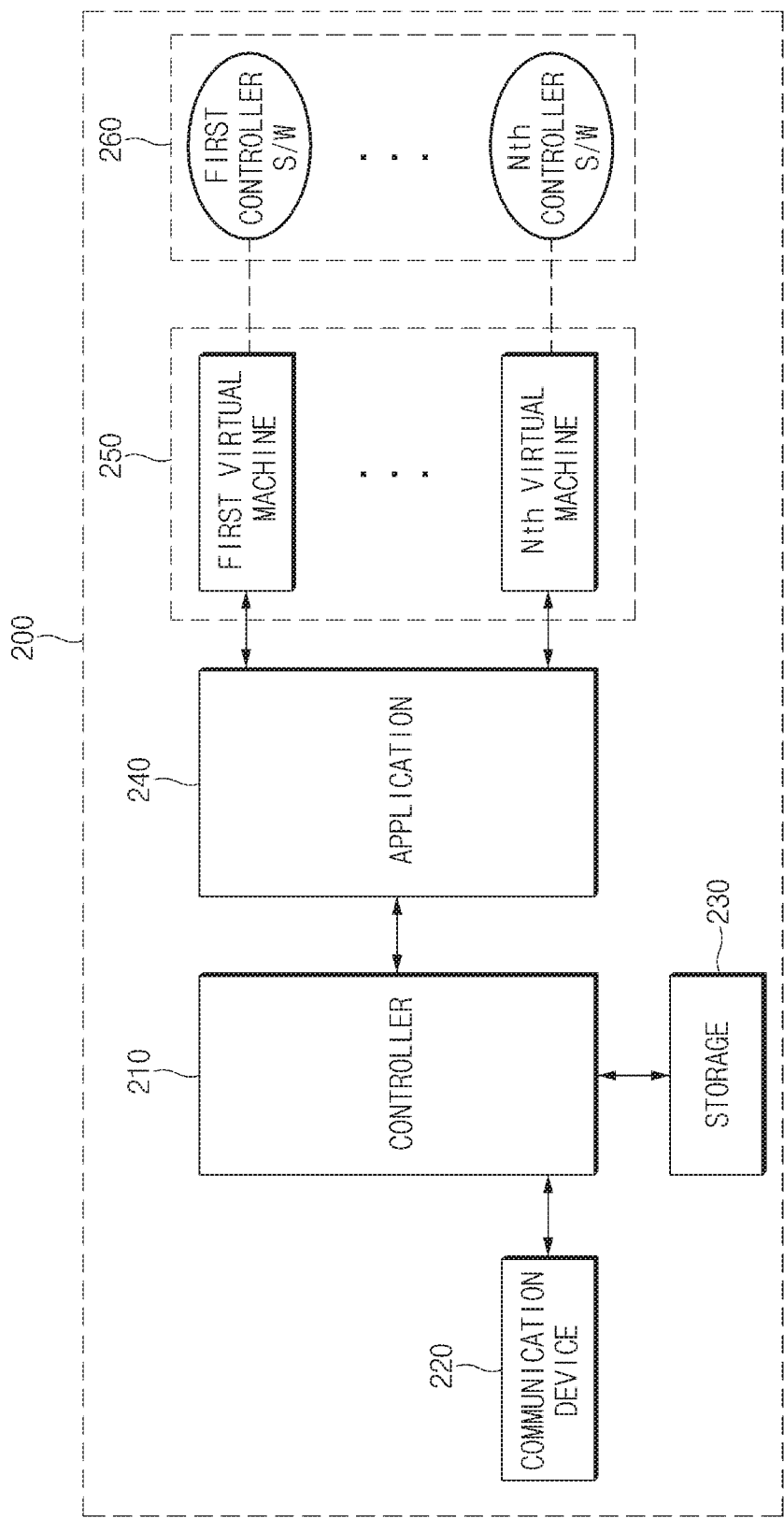
FIG. 4 is a block diagram illustrating a server according to embodiments of the present disclosure.

FIG. 4 is a block diagram illustrating the server 200 according to embodiments of the present disclosure.

As shown in FIG. 4, the server 200 includes a controller 210, a communication device 220, storage 230, an application 240, and a plurality of virtual machines 250.

The communication device 220 may include a communication module that supports a communication interface with the telematics terminal 100. For example, the communication device 220 may receive the information about the upper level controllers transmitted from the telematics terminal 100. In addition, the communication device 220 may receive the input data transmitted from the telematics terminal 100. In addition, the communication device 220 may transmit the second output data, which are generated as a result of executing of one controller software 260, to the telematics terminal 100

In this case, the communication module may include a module that supports wireless Internet communication such as wireless LAN (WLAN), wireless broadband (Wibro), Wi-Fi, world interoperability for microwave access (Wimax), and the like.

The storage 230 stores information about the upper level controllers and a ROM binary of the software installed in the upper level controllers.

In addition, the storage 230 may store commands, data and/or algorithms necessary for the operation of the server 200.

In this case, the storage 230 may include a storage medium such as a random access memory (RAM), a static random access memory (SRAM), a read-only memory (ROM), a programmable read-only memory (PROM), an electrically erasable programmable read-only memory (EEPROM), and the like.

The application 240 manages information about the upper level controllers received through the communication device 220. In this case, the application 240 matches the information about the virtual machine 250, which identifies and executes the ROM binary of the corresponding controller software 260, with the information about each upper level controller to manage the information.

As an example, the application 240 defines the information about the upper level controllers, the information about the virtual machine 250 matched with each upper level controller, input and output values of the corresponding controller software 260, and the like in a table of FIG. 5, and manages the information through the corresponding table.

As shown in FIG. 5, the software (S/W) ID, version, ROM binary information, virtual machine information, input and output values are defined in a table.

When receiving the input data from the telematics terminal 100 through the communication device 220, the controller 210 transmits the received input data and the information about the upper level controller corresponding to the input data, such as software ID and version information, to the application 240.

Thus, the application 240 verifies the ROM binary corresponding to the information about the upper level controller transmitted from the controller 210 among the information defined in the table of FIG. 5, and executes the virtual machine 250 matched with the verified ROM binary.

The virtual machine 250 is executed by the application 240. The virtual machine 250 emulates an MCU suitable for the corresponding controller and executes the ROM binary of the corresponding controller software 260. In this case, the virtual machine 250 is executed with the input data transferred from the controller 210 as an input value of the ROM binary.

Therefore, the second output data corresponding to the input data may be generated as a result of executing the ROM binary of the controller software 260.

For example, in the case of the SCC, when the vehicle speed, the set speed, and the like are input as input values, acceleration, braking, and the like may be output as output values.

The application 240 transfers the second output data, which are generated as the execution result of the ROM binary, to the controller 210. Accordingly, the controller 210 transmits the second output data to the telematics terminal 100 through the communication device 220.

Thus, the determination device 160 of the telematics terminal 100 compares the first output data with the second output data when the first output data and the second output data are collected by the data collection device 150. In this case, the first output data are data output by executing the software of the upper level controller, and the second output data are data output by executing the software of the upper controller in the server (200). Therefore, the determination device 160 compares the first output data with the second output data to determine whether the first output data with the second output data are identical.

For example, as shown in FIG. 6, the determination device 160 compares the CAN signal (CF_SCC_AccDem) output from the upper level controller corresponding to the required acceleration with the first signal output from the server 200. In this case, the determination device 160 determines that the first output data is valid when the two signal values are the same, the difference value between the two signals is within the tolerance of 1.5 m/s$^2$, or the time difference between two signals is within the tolerance of 2 seconds, and if not, the determination device 160 determines that the first output data are invalid.

In this case, the determination device 160 may determine the validity of the first output data by performing a redundancy check on the first and second output data.

When it is determined that the first output data is invalid, the determination device 160 transmits the determination result to the mode controller 170.

Thus, when it is determined that the first output data is invalid, the mode controller 170 outputs a control signal for entering the safe mode to the lower level controllers connected to the corresponding upper level controller. Accordingly, the corresponding lower level controllers enter the safe mode according to the control signal for entering the safe mode, which is output from the mode controller 170, thereby blocking the automatic control function by the upper level controller.

In this case, the controller 110 may output the determination result through the interface 120 and provide a driver with the state information of the upper and/or lower level controllers. For example, the controller 110 may output a warning message through the display or a warning sound. In addition, the controller 110 may also turn on a warning lamp.

Meanwhile, when it is determined that the first output data is valid, the determination device 160 outputs the result to the controller 110. Similarly, the controller 110 may output the determination result of the determination device 160 through the interface 120 to provide the driver with the state information of the upper and/or lower level controllers.

The telematics terminal 100 according to the present embodiment operating as described above may be implemented in the form of an independent hardware device including a memory and a processor for processing each operation and may be driven in the form contained in another hardware device such as a microprocessor or a general-purpose computer system.

The telematics terminal 100 according to the present disclosure may be implemented inside a vehicle. In this case, the telematics terminal 100 may be integrally formed with the controllers inside the vehicle, or may be implemented as a separate device and connected to the controllers of the vehicle by separate connecting means.

The operation flow of the system configured according to the present disclosure as described above will be described in more detail as follows.

Figure 7:
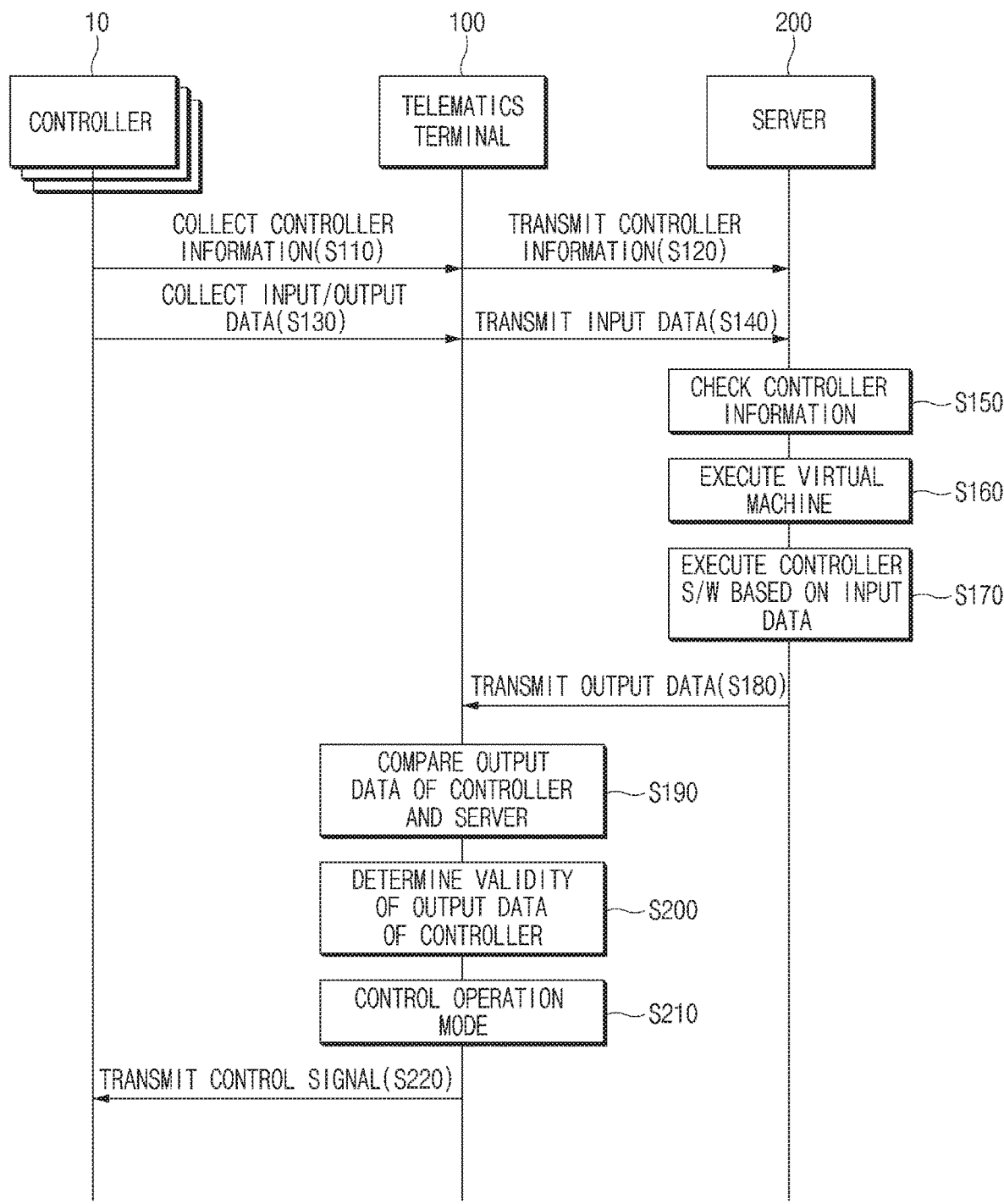
FIG. 7 is a flowchart illustrating a method for verifying vehicle controller based on a virtual machine according to embodiments of the present disclosure.

FIG. 7 is a flowchart illustrating a method for verifying vehicle controller based on a virtual machine according to embodiments of the present disclosure.

As shown in FIG. 7, in operation S110, the telematics terminal 100 collects information about controllers, for example, the upper and lower level controllers. The telematics terminal 100 may collect the information of the controllers every time when the ignition of the vehicle is turned on.

In this case, in operation S120, the telematics terminal 100 transmits the information about the upper level controllers, such as software ID and version information, and the like, among the information collected in the operation S110 to the server 200. The server 200 may store and manage the software information of the upper level controller received in operation S120 while matching the software information with the information about the virtual machine 250 executing the corresponding ROM binary.

In addition, in operation S130, the telematics terminal 100 collects the input/output data of the upper level controllers of the vehicle. In this case, the telematics terminal 100 may perform operation S130 every period specified in advance. In this case, in operation S140, the telematics terminal 100 transmits the input data of the upper level controllers among the input/output data collected in operation S130 to the server 200. In operation S140, the telematics terminal 100 may transmit the software ID and version information of the corresponding upper level controller together.

In operation S150, the server 200 verifies the information about the upper level controller in the input data received in operation S140. In operation S150, the server 200 may determine the ROM binary corresponding to the software ID and version of the upper level controller, and confirm the virtual machine 250 corresponding to the determined ROM binary.

Thereafter, in operation S160, the server 200 executes the virtual machine 250 verified in operation S150. In this case, in operation S170, the virtual machine 250 executes the ROM binary of the controller software 260 based on the input data received in operation S140. In operation S180, the server 200 transmits, to the telematics terminal 100, the output data (the second output data) including the output value obtained by executing the ROM binary in operation S170.

Thus, in operation S190, the telematics terminal 100 compares the output data (i.e., the first output data) of the upper level controller collected in operation S130 with the output data (i.e., the second output data) received in operation S180, and, in operation S200, determines the validity of the output data (i.e., the first output data) of the upper level controller based on the comparison result.

When it is determined in operation S200 that the output data (i.e., the first output data) of the upper level controller is invalid, in operation S210, the server 200 generates an operation mode control signal for the lower level controllers corresponding to the corresponding upper level controller, and, in operation S220, transmits the operation mode control signal to each lower level controller. Accordingly, the lower level controllers enter the safe mode according to the control signal received in operation S220.

Meanwhile, when it is confirmed in operation S200 that the output data (i.e., the first output data) of the upper level controller is valid, operations S210 and S220 may be omitted.

As described above, according to the system and method for verifying vehicle controller based on a virtual machine of the present disclosure, the same program execution environment as that of the controller is provided through the virtual machine of the server 200 without separately adding a monitoring semiconductor for each controller, so that it is possible to seek a stable verification scheme.

Figure 8:
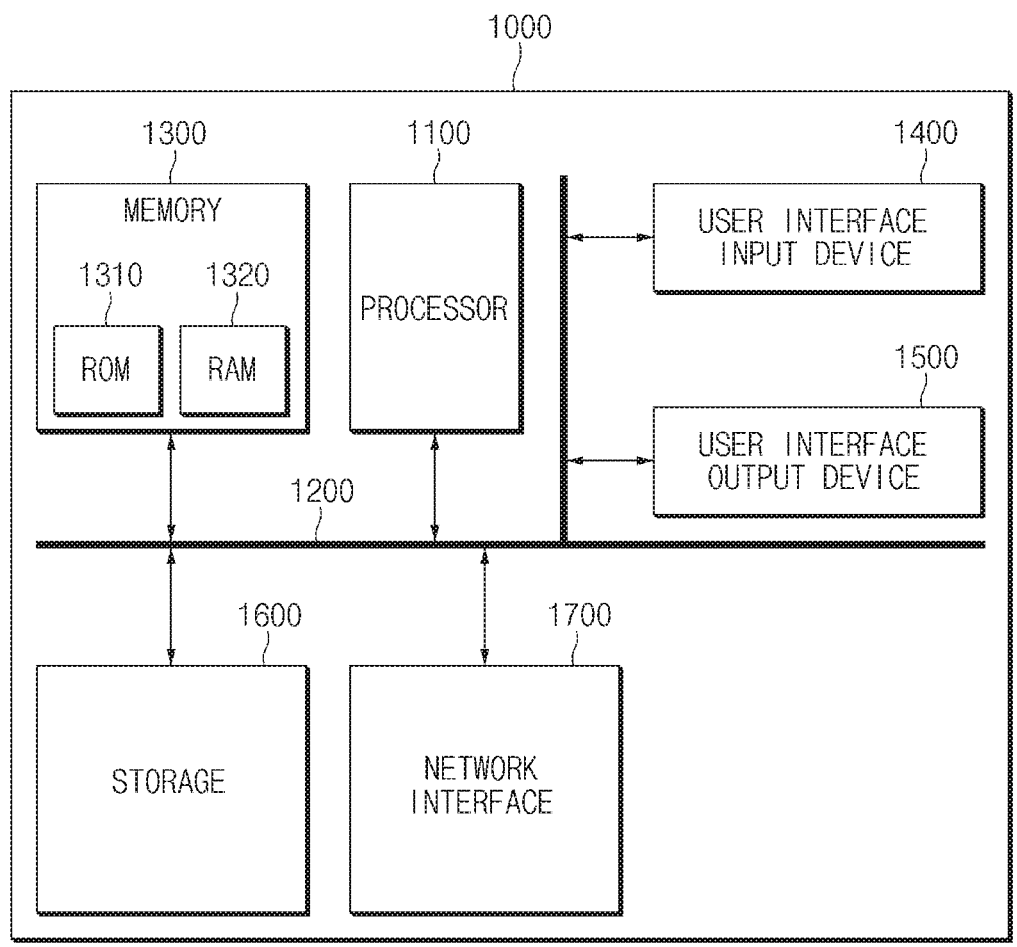
FIG. 8 is a view illustrating a computing system in which a method according to embodiments of the present disclosure is executed.

FIG. 8 is a view illustrating a computing system in which a method according to embodiments of the present disclosure is executed.

As shown in FIG. 8, a computing system 1000 may include at least one processor 1100, a memory 1300, a user interface input device 1400, a user interface output device 1500, storage 1600, and a network interface 1700, which are connected to each other through a bus 1200.

The processor 1100 may be a central processing unit (CPU) or a semiconductor device which performs processing for instructions stored in the memory device 1300 and/or the storage 1600. The memory 1300 and the storage 1600 may include various types of volatile or non-volatile storage media. For example, the memory 1300 may include a read only memory (ROM) 1310 and a random access memory (RAM) 1320.

The operations of a method or algorithm described in connection with the embodiments disclosed herein may be embodied directly in hardware, in a software module executed by the processor 1100, or in a combination of the two. The software module may reside in a storage medium (that is, the memory 1300 and/or the storage 1600) such as a random access memory (RAM), a flash memory, a read only memory (ROM), an erasable programmable ROM (EPROM), an electrically erasable programmable ROM (EEPROM), registers, hard disk, a removable disk, a compact disc-ROM (CD-ROM), or the like. An exemplary storage medium is coupled to the processor 1100 such that the processor 1100 may read information from, and write information to, the storage medium. Alternatively, the storage medium may be integrated into the processor 1100. The processor and the storage medium may reside in an ASIC. The ASIC may reside within a user terminal. Alternatively, the processor and the storage medium may reside in the user terminal as individual components.

According to the present disclosure, by the same program execution environment as that of the controller through the virtual machine of the server, it is possible to check the redundancy of the output data of each controller to establish a stable verification scheme.

In addition, according to the present disclosure, since there is no need to provide an additional monitoring semiconductor for each controller by checking the redundancy of the output data of each controller based on the server, the cost of manufacturing the vehicle controller may be minimized.

Hereinabove, although the present disclosure has been described with reference to certain embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A system for verifying a vehicle controller based on a virtual machine, the system comprising:
    a server configured to store software of upper level controllers of a vehicle and to execute the software of the upper level controllers through the virtual machine; and
    a telematics terminal configured to collect input data of the upper level controllers and to transmit the input data to the server, wherein the telematics terminal is further configured to compare first output data collected from the upper level controllers with second output data received from the server corresponding to the input data, and to verify a validity of the first output data based on the comparison of first output data with the second output data, wherein the input data is transmitted from lower level controllers to the upper level controllers, wherein the first output data is output from the upper level controllers to control the lower level controllers in response to the input data, wherein the telematics terminal is further configured to output a control signal to allow the lower level controllers connected to a corresponding upper level controller to enter a safe mode when the telematics terminal determines that the first output data is invalid, wherein the lower level controllers are configured to block an automatic control function by the upper level controller, and wherein the server is further configured to define and manage information in a table corresponding to software identifications (IDs), versions, read-only memory (ROM) binaries, virtual machines, input values, and output values of the upper level controllers.

2. The system of claim 1, wherein the telematics terminal is further configured to transmit software ID and version information of a corresponding upper level controller together when the upper level controllers transmit the input data.

3. The system of claim 2, wherein the server is further configured to verify a ROM binary based on the software ID and the version information of the upper level controller received from the telematics terminal, and to execute a virtual machine matching the verified ROM binary.

4. The system of claim 3, wherein the virtual machine is configured to emulate the upper level controller and execute the verified ROM binary based on the input data of the upper level controller.

5. The system of claim 4, wherein the server is further configured to generate the second output data based on an output value obtained by executing the ROM binary.

6. The system of claim 1, wherein the telematics terminal is further configured to perform a redundancy check on the first output data and the second output data to verify the validity of the first output data.

7. The system of claim 1, wherein the upper level controllers include at least one of a power train domain control unit, a chassis domain control unit, a body/convenience domain control unit, a driver assistance system, and an autonomous drive control system.

8. The system of claim 1, wherein the lower level controllers include at least one of an engine, a transmission, a brake, a steering, an air conditioning controller unit, and a seat control unit connected to each of the upper level controllers to control operations of a sensor and an actuator.

9. A method for verifying a vehicle controller based on a virtual machine, the method comprising:

collecting, by a telematics terminal, input data of upper level controllers of a vehicle and first output data of the upper level controllers;

transmitting, by the telematics terminal, the input data to a server storing software of the upper level controllers;

executing, by the server, the software of the upper level controllers through the virtual machine to generate second output data corresponding to the input data;

transmitting, by the server, the second output data to the telematics terminal;

comparing, by the telematics terminal, the first output data with the second output data;

verifying, by the telematics terminal, a validity of the first output data based on the comparison of first output data with the second output data;

outputting, by the telematics terminal, a control signal to allow the lower level controllers connected to a corresponding upper level controller to enter a safe mode when the telematics terminal determines that the first output data is invalid, and blocking, by the lower level controllers, an automatic control function by the upper level controller, wherein the input data is transmitted from lower level controllers to upper level controllers, wherein the first output data is output from the upper level controllers to control the lower level controllers in response to the input data, transmitting, by the telematics terminal, software information of the upper level controllers to the server; and defining and managing, by the server, information in a table corresponding to software IDs, versions, ROM binaries, virtual machines, input values, and output values of the upper level controllers.

10. The method of claim 9, wherein the transmitting of the input data comprises:

transmitting, by the telematics terminal, software ID and version information of a corresponding upper level controller with input data of the upper level controllers.

11. The method of claim 10, wherein the transmitting of the second output data comprises:

verifying, by the server, a ROM binary based on the software ID and the version information of the upper level controller received from the telematics terminal; and executing, by the server, a virtual machine matching the checked ROM binary.

12. The method of claim 11, wherein the transmitting of the second output data comprises:

emulating, by the virtual machine, the upper level controller; and executing, by the virtual machine, the checked ROM binary based on the input data of the upper level controller.

13. The method of claim 12, further comprising:

generating, by the server, the second output data based on an output value obtained by executing the ROM binary.

14. The method of claim 9, wherein the verifying of the validity comprises:

performing, by the telematics terminal, a redundancy check on the first output data and the second output data.

15. The method of claim 9, wherein the transmitting of the input data is performed every preset period.

* * * * *